US006799385B2

(12) United States Patent
Champney

(10) Patent No.: US 6,799,385 B2
(45) Date of Patent: Oct. 5, 2004

(54) ABRASION RESISTANT EARTH WORKING SURFACE AND WELD STUD

(75) Inventor: Clark B. Champney, Huron, OH (US)

(73) Assignee: Nelson Stud Welding, Inc., Elyria, OH (US)

(*) Notice: Subject to any disclaimer, the term of this patent is extended or adjusted under 35 U.S.C. 154(b) by 0 days.

(21) Appl. No.: 10/374,608

(22) Filed: Feb. 26, 2003

(65) Prior Publication Data

US 2003/0167663 A1 Sep. 11, 2003

Related U.S. Application Data

(60) Provisional application No. 60/363,060, filed on Mar. 11, 2002.

(51) Int. Cl.[7] ............................. E02F 3/00; E02F 3/80; E02F 9/28
(52) U.S. Cl. ........................ 37/451; 37/453; 37/460; 37/903; 172/701.3; 172/719; 172/745
(58) Field of Search ................... 37/460, 446–459, 37/466, 903; 172/772, 772.5, 701.1–701.3, 713–719, 745, 753, 540, 554, 21, 22, 122, 123

(56) References Cited

U.S. PATENT DOCUMENTS 3,751,928 A * 8/1973 Hughes et al. .............. 405/184
4,129,952 A    12/1978 Olson ........................... 37/118
4,547,985 A    10/1985 Silins et al. .................. 37/118
4,661,113 A *  4/1987 Adkins ......................... 623/65
5,203,513 A     4/1993 Keller et al. ................. 241/30
5,411,318 A *  5/1995 Law ........................ 297/452.45
5,887,878 A *  3/1999 Tisbo et al. ............. 280/47.19

FOREIGN PATENT DOCUMENTS

DE    29600480 U1    4/1996
DE    20105994 U1    8/2001

OTHER PUBLICATIONS

International Search Report dated Jun. 16, 2003.

* cited by examiner

Primary Examiner—Christopher J. Novosad
(74) Attorney, Agent, or Firm—Howard & Howard

(57) ABSTRACT

An abrasion resistant metal earth working surface having a plurality of spaced hollow open ended cup-shaped abrasion resistant studs welded to the surface which collect particulate material in the hollow open ends of the weld studs, wherein the particulate material forms an abrasion resistant barrier limiting abrasion of the earth working surface. The size and shape of the cup-shaped weld studs and the spacing between the array of studs is selected to provide optimum collection of particulate material which reduces wear to extend the efficient operation and life of the earth working surface.

18 Claims, 2 Drawing Sheets

ABRASION RESISTANT EARTH WORKING SURFACE AND WELD STUD

RELATED APPLICATIONS

This application claims priority to U.S. Provisional Application Ser. No. 60/363,060, filed Mar. 11, 2002.

FIELD OF THE INVENTION

The present invention relates to an abrasion resistant earth working surface useful for various earth working implements or tools including, but not limited to, dozer blades, evacuation and backhoe buckets, grinders and the like, subject to abrasion and an open ended hollow abrasion resistant weld stud.

BACKGROUND OF THE INVENTION

There are numerous earth working implements and tools having a metal surface subject to abrasive wear from sand, rocks and the like. As used herein, the term "earth working" includes an implement or tool having metal surfaces subject to abrasion, including buckets, blades, grinders, etc. used in the construction, road building and mining industries, for example. Various methods have been utilized to renew such surfaces subject to abrasion including for example arc welding a consumable electrode onto the worn metal surfaces, thermal or plasma spraying a metal surface over the worn surface and the like. Wear strips have also been utilized which may be secured by weld studs or welded onto the metal surfaces subject to wear such as disclosed, for example, in U.S. Pat. No. 4,129,952.

The prior art has also proposed various methods of reducing wear or abrasion of metal earth working surfaces including welding an array of cast abrasion resistant studs onto the metal surfaces such as disclosed in U.S. Pat. No. 4,547,985. However, such cast abrasion resistant studs are similarly subject to abrasive wear or breakage during use.

The need therefore remains for an improved abrasion resistant earth working surface and weld stud which effectively shields the surfaces of an earth working tool or implement during use.

SUMMARY OF THE INVENTION

The abrasion resistant metal earth working surface of this invention includes a plurality of spaced hollow open ended abrasion resistant studs welded to the earth working surface which collect particulate material in the hollow open end of the abrasion resistant studs, forming an abrasion resistant barrier over the studs and the metal earth working surfaces. In the preferred embodiment, the abrasion resistant studs have a length measured from the earth working surface less than about one inch, limiting breakage of the studs and the studs are closely spaced on the earth working surface a distance which promotes collection of particulate material between the studs, thereby providing an abrasion barrier of particulate material covering the earth working surface. As set forth above, the metal earth working surface may be any implement or tool having a metal surface subject to abrasion from earth, sand, rocks and the like, including but not limited to buckets, blades, grinders, etc. used for example by the construction, road building and mining industries, but is not limited to such applications. The drawings illustrate, as an example only, an excavator bucket having a plurality of closely spaced hollow open ended abrasion resistant studs welded to the metal surfaces of the excavator bucket which collect particulate material including earth, sand, small rocks, dirt and other particulate material forming an abrasion barrier of the particulate material limiting wear of both the earth working surfaces and the abrasion resistant hollow studs.

In one preferred embodiment of the abrasion resistant metal earth working surface of this invention, the abrasion resistant studs are spaced on the metal earth working surface a distance 1.5 and six times the diameter of the abrasion resistant studs, such that the particulate material also collects on the metal earth working surface between the studs forming a protective abrasion resistant layer of particulate material protecting the previously exposed metal earth working surface or surfaces. In the disclosed embodiment, the abrasion resistant studs each have a diameter of about one inch or less and the internal diameter of the opening through the hollow open end is equal to one-third the external diameter of the studs or greater or preferably about one-half the external diameter of the studs. In one preferred embodiment, the body portion of the studs includes a cylindrical body portion having a cylindrical opening through the distal end and a generally flat proximal end having a projecting preferably conical flux tip formed of aluminum or other suitable flux. That is, the abrasion resistant weld studs are cup-shaped to collect particulate material following welding to the metal earth working surface.

In one preferred embodiment, the abrasion resistant studs have a diameter of about one inch or less and the inside diameter of the cylindrical opening is at least one-third the diameter of the body portion or preferably at least one-half or greater than the external diameter of the body portion. Thus, the studs are preferably spaced on the metal earth working surface a distance between centers of less than about twice the diameter of the abrasion resistant studs assuring collection of the particulate material between the studs forming a protective abrasion resistant barrier of the metal earth working surface and the cup-shaped studs. As set forth below, the abrasion resistant studs of this invention may be formed of various material including ferrous and non-ferrous alloys.

DESCRIPTION OF THE PREFERRED EMBODIMENTS

Figure 1:
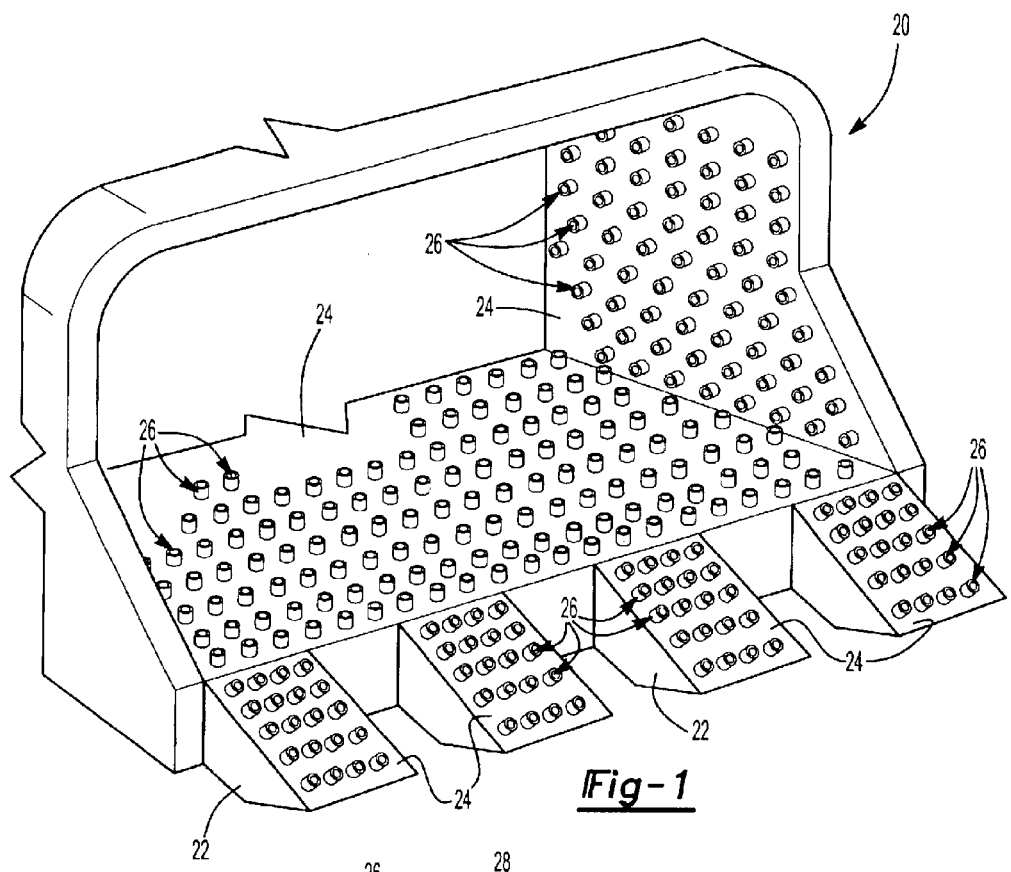
FIG. 1 is a partial top perspective view of a conventional excavator bucket, wherein the internal metal earth working surfaces are protected with the abrasion resistant studs of this invention.

FIG. 1 is a partial elevation of a conventional excavator bucket 20 having a plurality of digger teeth 22. As will be understood by those skilled in this art, the excavator bucket 20 and digger teeth 22 each have a plurality of metal earth working surfaces 24 which are subject to wear during use from earth, sand, rocks and other particulate material. However, in the disclosed embodiment of this invention, the metal earth working surfaces 24 include a plurality or array of abrasion resistant cup-shaped weld studs 26 which provide an abrasion resistant barrier as described below.

Figure 2:
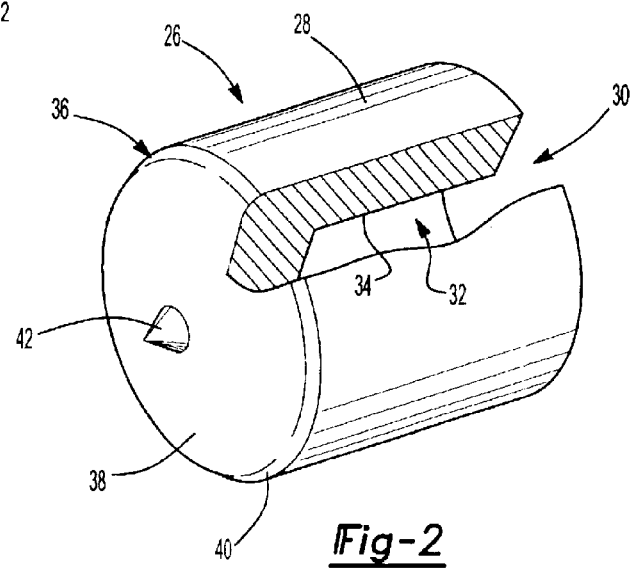
FIG. 2 is a side perspective view of one embodiment of an abrasion resistant stud of this invention.
Figure 3:
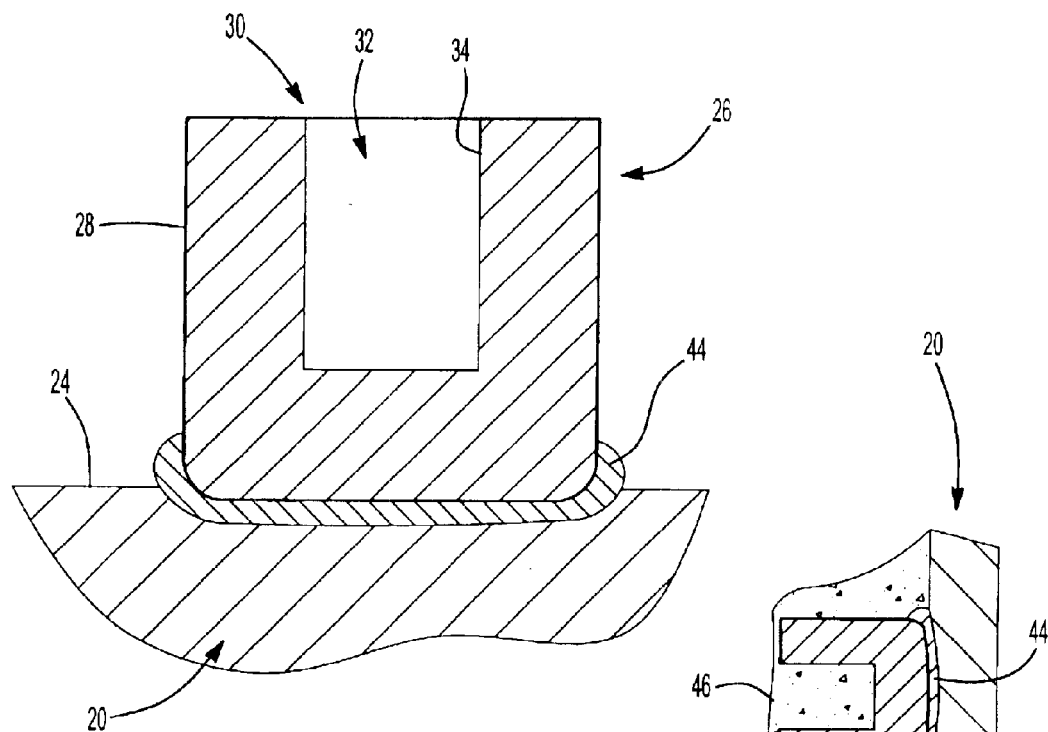
FIG. 3 is a side cross-sectional view of the abrasion resistant stud shown in FIG. 2 following welding to a metal earth working surface.

FIG. 2 illustrates one preferred embodiment of the abrasion resistant cup-shaped weld studs 26, wherein each of the weld studs include a body portion having a cylindrical external surface 28, an open end 30 including an opening or cavity 32 as shown in FIG. 3 having a cylindrical inner surface 34, a base portion 36, as shown in FIG. 2, having a flat or generally flat bottom surface 38, an arcuate surface 40 intermediate the cylindrical external surface 28 and the flat bottom surface 38 and the bottom surface 38 includes a generally conical flux 42. The abrasion resistant weld stud is also unique because the cylindrical bore 32 permits the use of an internal male chuck during welding. As will be understood by those skilled in this art, the preferred flux 42 will depend upon the alloy selected for the weld stud 26. In a typical application, the weld flux 42 will be formed of aluminum, or an aluminum alloy, wherein an opening or bore (not shown) is formed in the bottom surface 38 of the base portion 36 and the flux 42 is deformed into the opening retaining the flux 42 to the base portion 36 of the weld stud 26. The weld studs 26 are then stud welded to the earth working surfaces 24 by drawing an electric arc between the flux 42 and the metal earth working surface 24, melting the flux 42 and the opposed metal surface 24. The weld studs 26 are then "plunged" into the molten metal, forming a weld 44 as shown in FIG. 3, securely retaining the abrasion resistant studs 26 to the earth working surfaces 24 of the excavator bucket 20.

Figure 4:
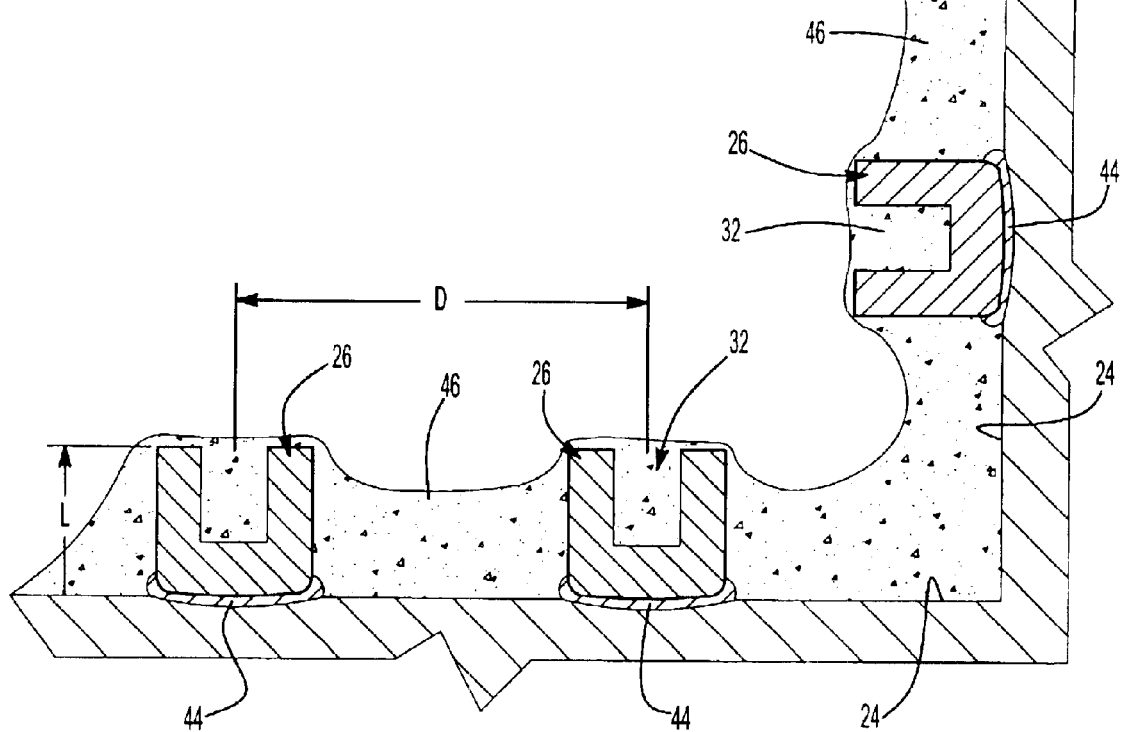
FIG. 4 is a side cross-sectional view of the excavator bucket shown in FIG. 1 during use illustrating the abrasion barrier provided by the abrasion resistant metal earth working surface of this invention.

FIG. 4 illustrates the excavator bucket 20 during use, wherein the abrasion resistant cup-shaped weld studs 26 retain an abrasion resistant barrier of particulate material 32 protecting the earth working surfaces 24. During use, the cup-shaped wear resistant weld studs 26 collect particulate material 46 in the openings or cavities 32 of the studs 26 and the particulate material 46 then provides an abrasion resistant barrier overlying the weld studs 26 and the earth working surfaces 24 between the weld studs 26 as shown in FIG. 4. As will be understood from the above description, the length "L" of the weld studs 26 should be selected to avoid undue stress and breaking of the weld 44 during use of the excavator bucket. Further, the distance "D" between adjacent weld studs 26 should be selected to assure collection of particulate material 46 between the weld studs 26 covering the earth working surfaces 24 as shown in FIG. 4. Finally, the diameter of the weld studs 26 and particularly the opening or cavity 32 should also be selected to assure collection of the particulate material 46. Based upon testing, the length "L" of the weld studs 26 should not be greater than about one inch and preferably the length should be between 0.5 and one inch.

The outer diameter of the cylindrical external surface 28 is also preferably less than about one inch or more preferably between ¾ and ⅝ inches, wherein the inside or inner diameter of the cylindrical inner surface 34 is at least one-third and preferably about one-half the external diameter or greater, providing a rugged wear resistant stud having a sufficient cavity 32 to assure collection of particulate material normally encountered by earth working tools or apparatus of the type described. The distance "D" between adjacent weld studs 26 should be between 1.5 and six times the diameter of the weld studs or more preferably between 1.5 and four times the diameter measured between the center axis of the weld studs as shown in FIG. 4. An array of weld studs 26 having these dimensions has been found to be particularly suitable for this application and assures an abrasion resistant barrier of particulate material 46 as shown in FIG. 4.

The material of the abrasion resistant weld studs 26 should be selected to reduce abrasive wear of the weld studs and may include ferrous or non-ferrous alloys preferably having a hardness of greater than about 40 Rockwell or more, preferably about 50 Rockwell on the C scale. Suitable ferrous alloy steels include 4037 steel, 8620 steel, 1527 steel, etc., wherein the ferrous alloy may include carbon, manganese, chromium, vanadium, molybdenum, nickel and other elements. Depending upon the material selected, the alloy may need to be heat treated to provide optimum abrasion resistance. The weld studs 26 may be formed by conventional cold forming techniques wherein the cavity 32 may be formed by back extrusion over a pin and may include a cone shaped end well, not shown.

As set forth above, the abrasion resistant metal earth working surface and weld stud of this invention may be utilized in any earth working tool or apparatus having metal surfaces subject to abrasion, including but not limited to bulldozer and excavator blades and buckets, excavators, crushers, grinders, etc. and thus is not limited to a particular application. Further, as will be understood by those skilled in this art, various modifications may be made to the abrasion resistant metal earth working surface and abrasion resistant stud of this invention within the purview of the appended claims. For example, the size, shape and spacing of the array of studs on the earth working surface may be selected for a particular application, such as digging or plowing relatively soft earth having a high abrasive sand content, wherein larger studs may be selected or smaller studs may be selected for impeller blades of a grinder or crusher. Having described a preferred embodiment of the abrasion resistant metal earth working surface and abrasion resistant stud of this invention, the invention is now claimed, as set forth below.

What is claimed is:

1. An abrasion resistant metal earth working surface having a plurality of spaced hollow open ended cup-shaped abrasion resistant studs welded to said surface each having a length measured from said surface of less than one inch, wherein said hollow open ended abrasion resistant cup-shaped studs collect particulate material during use forming an abrasion barrier overlying said studs and said studs are substantially equally spaced on said surface a distance which provides accumulation of said particulate material between said abrasion resistant cup-shaped studs providing a barrier of particulate material overlying said metal earth working surface during use.

2. The abrasion resistant metal earth working surface as defined in claim 1, wherein said abrasion resistant studs are spaced on said metal earth working surface a distance of between 1.5 and 6 times a diameter of said abrasion resistant studs.

3. The abrasion resistant metal earth working surface as defined in claim 2, wherein said abrasion resistant cup-shaped studs each have a diameter of one inch or less and said hollow open ended abrasion resistant studs each have an opening through a distal end thereof equal to one-half said diameter or less.

4. The abrasion resistant metal earth working surface as defined in claim 1, wherein said abrasion resistant studs each include a generally cylindrical outer surface and each include an opening through a distal end having a cylindrical inner diameter.

5. The abrasion resistant metal earth working surface, as defined in claim 4, wherein said inner diameter is equal to about one-half said outer diameter.

6. The abrasion resistant metal earth working surface as defined in claim 1, wherein said abrasion resistant cup-shaped studs each has an outer diameter of one inch or less and are spaced on said metal earth working surface a distance between centers of between 1.5 and 6 times said outer diameter or less.

7. An abrasion resistant weld stud for welding to an earth working metal surface, said abrasion resistant stud formed of an abrasion resistant metal alloy, comprising a generally cylindrical cup-shaped body having an outer diameter of one inch or less including an open distal end, a generally smooth cylindrical opening through said open distal end having an internal diameter equal to one-third to one-half said outer diameter of said generally cylindrical cup-shaped body and a proximal end including a central projecting weld flux adapted to weld said abrasion resistant stud to a metal earth working surface.

8. The abrasion resistant weld stud as defined in claim 7, wherein said cylindrical body of said weld stud has a length of one inch or less following welding.

9. The abrasion resistant weld stud as defined in claim 7, wherein said weld stud has a hardness of 40 Rockwell or greater.

10. An abrasion resistant barrier on a metal earth working surface, comprising:
a plurality of generally equally spaced abrasion resistant studs welded to said metal earth working surface, each abrasion resistant stud having an open distal end; and
particulate material collected in said open distal end of said abrasion resistant studs and said particulate material accumulating between said plurality of generally equally spaced abrasion resistant studs forming said abrasion resistant barrier overlying said abrasion resistant studs and said earth working surface between said abrasion resistant studs.

11. An abrasion resistant barrier on a metal earth working surface, as defined in claim 10, wherein said abrasion resistant studs each extend from said metal earth working surface a distance of less than one inch.

12. The abrasion resistant barrier on a metal earth working surface as defined in claim 10, wherein said abrasion resistant studs are generally equally spaced on said metal earth working surface a distance of between 1.5 and 6 times a diameter of said abrasion resistant studs.

13. The abrasion resistant barrier on a metal earth working surface as defined in claim 12, wherein said abrasion resistant studs each have a diameter of one inch or less.

14. The abrasion resistant barrier on a metal earth working surface as defined in claim 10, wherein said hollow open ended abrasion resistant studs are each generally cylindrical having a cylindrical opening through a distal end of said studs.

15. The abrasion resistant barrier on a metal earth working surface as defined in claim 14, wherein said opening has an inside diameter approximately equal to one-half an outside diameter of said studs or less.

16. The abrasion resistant barrier on a metal earth working surface as defined in claim 15, wherein each of said abrasion resistant studs has an outer diameter of one inch or less and said abrasion resistant studs are spaced on said metal earth working surface a distance between centers of between 1.5 and 6 times said outer diameter of said studs.

17. The abrasion resistant barrier on a metal earth working surface as defined in claim 10, wherein said abrasion resistant studs have a hardness of 40 Rockwell or greater.

18. The abrasion resistant barrier on a metal earth working surface as defined in claim 10, wherein each of said abrasion resistant studs has a cylindrical outer sidewall, a cylindrical inner sidewall and an annular end portion extending generally perpendicular to said cylindrical inner and outer side walls.

* * * * *